(12) United States Patent
Fung et al.

(10) Patent No.: US 12,134,008 B2
(45) Date of Patent: Nov. 5, 2024

(54) EXERCISE MACHINE PLATFORM FOR EMULATION OF REALISTIC MOVEMENT

(71) Applicant: Blue Goji LLC, Austin, TX (US)

(72) Inventors: Coleman Fung, Spicewood, TX (US);
Tiffany Tao, Austin, TX (US);
Matthew Pierce Kanter, Austin, TX (US)

(73) Assignee: BLUE GOJI LLC, Austin, TX (US)

( * ) Notice: Subject to any disclaimer, the term of this patent is extended or adjusted under 35 U.S.C. 154(b) by 700 days.

(21) Appl. No.: 17/345,216

(22) Filed: Jun. 11, 2021

(65) Prior Publication Data

US 2021/0291012 A1 Sep. 23, 2021

Related U.S. Application Data

(63) Continuation-in-part of application No. 16/951,281, filed on Nov. 18, 2020, now Pat. No. 11,123,604, (Continued)

(51) Int. Cl.
*A63B 22/14* (2006.01)
*A63B 22/00* (2006.01)
(Continued)

(52) U.S. Cl.
CPC ...... *A63B 24/0003* (2013.01); *A63B 22/0046* (2013.01); *A63B 22/0285* (2013.01); *A63B 22/0292* (2015.10); *A63B 22/06* (2013.01); *A63B 23/04* (2013.01); *A63F 13/212* (2014.09); *A63F 13/214* (2014.09); *A63F 13/40* (2014.09);
(Continued)

(58) Field of Classification Search
CPC .......... A63B 2225/09; A63B 2225/093; A63B 2225/096; A63B 22/0015; A63B 22/0017; A63B 22/0023; A63B 22/0025; A63B 22/0046; A63B 2022/0028; A63B 21/0004; G06F 3/016; G06F 3/0346; G06T 19/006
See application file for complete search history.

(56) References Cited

U.S. PATENT DOCUMENTS 7,857,732 B2 * 12/2010 Nielson .................. A63B 69/16
482/61
2008/0058172 A1 3/2008 Tyree
(Continued)

OTHER PUBLICATIONS

Shane Thomas, International Search Report, Sep. 12, 2022, p. 3.

*Primary Examiner* — Lawrence S Galka
(74) *Attorney, Agent, or Firm* — Galvin Patent Law LLC; Brian R. Galvin

(57) ABSTRACT

An exercise machine platform that allows for emulation of the natural movements of real-world modes of transportation in stationary exercise machines such as bicycles, rowing machines, elliptical machines, and treadmills. The exercise machine platform comprises a base with one or more powered lifting mechanisms, a frame supported by the lifting mechanisms of the base which allows for roll, pitch, and/or vertical displacement movements, and a rocker plate supported by the frame that allows for additional independent movement from the roll, pitch, and/or vertical displacement movements of the frame. A dampening system controls the additional independent movement between the frame and rocker plate.

17 Claims, 14 Drawing Sheets

Related U.S. Application Data which is a continuation of application No. 17/030,195, filed on Sep. 23, 2020, which is a continuation-in-part of application No. 16/781,663, filed on Feb. 4, 2020, now Pat. No. 11,191,996, which is a continuation-in-part of application No. 16/354,374, filed on Mar. 15, 2019, now Pat. No. 10,549,153, which is a continuation-in-part of application No. 16/176,511, filed on Oct. 31, 2018, now Pat. No. 10,960,264, which is a continuation-in-part of application No. 16/011,394, filed on Jun. 18, 2018, now Pat. No. 10,155,133, which is a continuation-in-part of application No. 15/853,746, filed on Dec. 23, 2017, now Pat. No. 10,265,578, which is a continuation of application No. 15/219,115, filed on Jul. 25, 2016, now Pat. No. 9,849,333, which is a continuation of application No. 15/193,112, filed on Jun. 27, 2016, now abandoned, which is a continuation-in-part of application No. 15/187,787, filed on Jun. 21, 2016, now Pat. No. 10,124,255, which is a continuation-in-part of application No. 15/175,043, filed on Jun. 7, 2016, now Pat. No. 9,766,696, and a continuation-in-part of application No. 14/846,966, filed on Sep. 7, 2015, now Pat. No. 10,080,958, and a continuation-in-part of application No. 14/012,879, filed on Aug. 28, 2013, now Pat. No. 10,737,175.

(60) Provisional application No. 62/330,602, filed on May 2, 2016, provisional application No. 62/330,642, filed on May 2, 2016, provisional application No. 62/310,568, filed on Mar. 18, 2016, provisional application No. 61/696,068, filed on Aug. 31, 2012.

(51) Int. Cl.
| | | |
|---|---|---|
| *A63B 22/02* | (2006.01) | |
| *A63B 22/06* | (2006.01) | |
| *A63B 22/16* | (2006.01) | |
| *A63B 23/04* | (2006.01) | |
| *A63B 24/00* | (2006.01) | |
| *A63B 69/18* | (2006.01) | |
| *A63F 13/212* | (2014.01) | |
| *A63F 13/214* | (2014.01) | |
| *A63F 13/40* | (2014.01) | |
| *A63F 13/65* | (2014.01) | |
| *G06F 1/16* | (2006.01) | |
| *G06F 3/01* | (2006.01) | |
| *G06T 19/00* | (2011.01) | |
| *H04W 84/18* | (2009.01) | |

(52) U.S. Cl.
CPC ............. *A63F 13/65* (2014.09); *G06F 1/163* (2013.01); *G06F 3/011* (2013.01); *G06F 3/016* (2013.01); *G06T 19/006* (2013.01); *H04W 84/18* (2013.01)

(56) References Cited

U.S. PATENT DOCUMENTS

| | | | |
|---|---|---|---|
| 2010/0075808 A1* | 3/2010 | Luberski | ................. A63B 22/18 482/8 |
| 2012/0071301 A1* | 3/2012 | Kaylor | ............. A63B 21/00058 482/57 |
| 2018/0161620 A1 | 6/2018 | Rothschild | |
| 2019/0184227 A1* | 6/2019 | Gouzenko | ............. G06F 1/1694 |
| 2020/0215381 A1* | 7/2020 | Bass | ....................... A63B 69/16 |
| 2021/0346752 A1* | 11/2021 | Holmes | .............. A63B 24/0075 |

\* cited by examiner

EXERCISE MACHINE PLATFORM FOR EMULATION OF REALISTIC MOVEMENT

CROSS-REFERENCE TO RELATED APPLICATIONS

Priority is claimed in the application data sheet to the following patents or patent applications, the entire written description of each of which is expressly incorporated herein by reference in its entirety:
16951281
17030195
16781663
16354374
16176511
16011394
15853746
15219115
15193112
15187787
15175043
62310568
14846966
14012879
61696068
62330602
62330642

BACKGROUND OF THE INVENTION

Field of the Art

The disclosure relates to the field of computer interaction, and more particularly to the field of input and output methods for interaction within software applications.

Discussion of the State of the Art

Stationary cardiovascular exercise machines such as bicycles, rowing machines, elliptical machines, and treadmills all have a common drawback, which is that they do not accurately emulate the feel of exercising in the real world. With the exception of changing pitch (incline/decline) in treadmills, these machines do not have the ability to emulate the natural motion of certain modes of transportation in the real world such as changes in the roll and pitch of the surface, changes in the texture or unevenness of the surface, vertical displacement such as when driving over obstacles, or the side-to-side sway of a bicycle, especially during a simulated uphill climb with high resistance while standing out of the saddle.

The natural motions significantly affect the feel of exercising in the real world, and are lost when exercising on stationary cardiovascular exercise machines. This reduction in natural sensation of movement contributes to boredom while engaging in exercise on stationary cardiovascular exercise machines, reducing both the desire to engage in exercise and the time spent exercising while engaging in such exercise.

What is needed is an exercise machine platform that allows for emulation of the natural movements of real-world modes of transportation in stationary cardiovascular exercise machines.

SUMMARY OF THE INVENTION

Accordingly, the inventor has conceived and reduced to practice, an exercise machine platform that allows for emulation of the natural movements of real-world modes of transportation in stationary exercise machines such as bicycles, rowing machines, elliptical machines, and treadmills. The exercise machine platform comprises a base with one or more powered lifting mechanisms, a frame supported by the lifting mechanisms of the base which allows for roll, pitch, and/or vertical displacement movements, and a rocker plate supported by the frame that allows for additional independent movement from the roll, pitch, and/or vertical displacement movements of the frame. A dampening system controls the additional independent movement between the frame and rocker plate.

According to a preferred embodiment, an exercise machine platform is disclosed, comprising: a base formed of rigid materials; one or more powered lifting mechanisms attached to the base; a frame formed of rigid materials, wherein: the frame is supported by the one or more powered lifting mechanisms; and the support between each powered lifting mechanism and the frame allows sufficient freedom of movement between that powered lifting mechanism and the frame such that operation of one or more of the one or more powered lifting mechanisms changes an angle of the frame relative to the base; a rocker plate formed of rigid materials, wherein: the rocker plate is supported by the frame; and the support between the frame and the rocker plate allows freedom of movement between the frame and the rocker plate in at least one direction; and a dampening system between the frame and rocker system.

According to an aspect of an embodiment, the one or more lifting mechanisms are jack screws.

According to an aspect of an embodiment, the one or more lifting mechanisms are pneumatic pistons.

According to an aspect of an embodiment, the one or more lifting mechanisms are hydraulic pistons.

According to an aspect of an embodiment, the support between the frame and the rocker plate is a rod and bearing system allowing for freedom of movement between the frame and rocker plate in a lateral direction relative to the orientation of an exercise machine resting on or attached to the exercise machine platform.

According to an aspect of an embodiment, the support between the frame and the rocker plate comprises universal joints allowing for freedom of movement between the frame and rocker plate both in a lateral direction and in a longitudinal direction relative to the orientation of an exercise machine resting on or attached to the exercise machine platform.

According to an aspect of an embodiment, the support between the frame and the rocker plate comprises the dampening system.

According to an aspect of an embodiment, the dampening system comprises a gas-filled or fluid-filled bladder.

According to an aspect of an embodiment, the bladder is gas-filled, and further comprising a gas compressor, compressed gas tank, or both, a valve for the gas-filled bladder, and an exhaust valve, wherein the gas-filled bladder can be inflated or deflated.

According to an aspect of an embodiment, the bladder is fluid-filled, and further comprising a fluid pump, a fluid reservoir, a valve for inflation and deflation of the fluid-filled bladder.

According to an aspect of an embodiment, the dampening system comprises two gas-filled or fluid-filled bladders arranged either laterally relative to the orientation of an exercise machine resting on or attached to the exercise machine platform or longitudinally relative to the orientation of an exercise machine resting on or attached to the exercise machine platform.

According to an aspect of an embodiment, the bladders are gas-filled, and further comprising a gas compressor, compressed gas tank, or both, a valve for each gas-filled bladder, and an exhaust valve, wherein the gas-filled bladders can each be independently inflated or deflated.

According to an aspect of an embodiment, the bladders are fluid-filled, and further comprising a fluid pump, a fluid reservoir, a valve for inflation and deflation of each fluid-filled bladder, wherein the fluid-filled bladders can each be independently inflated or deflated.

According to an aspect of an embodiment, the two bladders are coupled such that the gas or fluid contents of the bladders can be exchanged.

According to an aspect of an embodiment, a rate of exchange of gas or fluid contents of the bladders is controlled by a valve in the coupling.

According to an aspect of an embodiment, the bladders are gas-filled, and further comprising a gas compressor, compressed gas tank, or both, a valve for at least one of the gas-filled bladders, and an exhaust valve, wherein the gas-filled bladders can each be inflated or deflated.

According to an aspect of an embodiment, the bladders are fluid-filled, and further comprising a fluid pump, a fluid reservoir, a valve for at least one of the fluid-filled bladders, wherein the fluid-filled bladders can each be inflated or deflated.

According to an aspect of an embodiment, the dampening system further comprises one or more additional gas-filled or fluid-filled bladders arranged on an axis transverse to the orientation of the first two gas-filled or fluid-filled bladders.

According to an aspect of an embodiment, all of the bladders are gas-filled, and further comprising a gas compressor, compressed gas tank, or both, a valve for each of the gas-filled bladders, and an exhaust valve, wherein the gas-filled bladders can each be independently inflated or deflated.

According to an aspect of an embodiment, all of the bladders are fluid-filled, and further comprising a fluid pump, a fluid reservoir, and a valve for each of the fluid-filled bladders, wherein the fluid-filled bladders can each be independently inflated or deflated.

According to an aspect of an embodiment, all of the bladders are coupled such that the gas or fluid contents of the bladders can be exchanged.

According to an aspect of an embodiment, a rate of exchange of gas or fluid contents of the bladders is controlled by a valve in the coupling.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
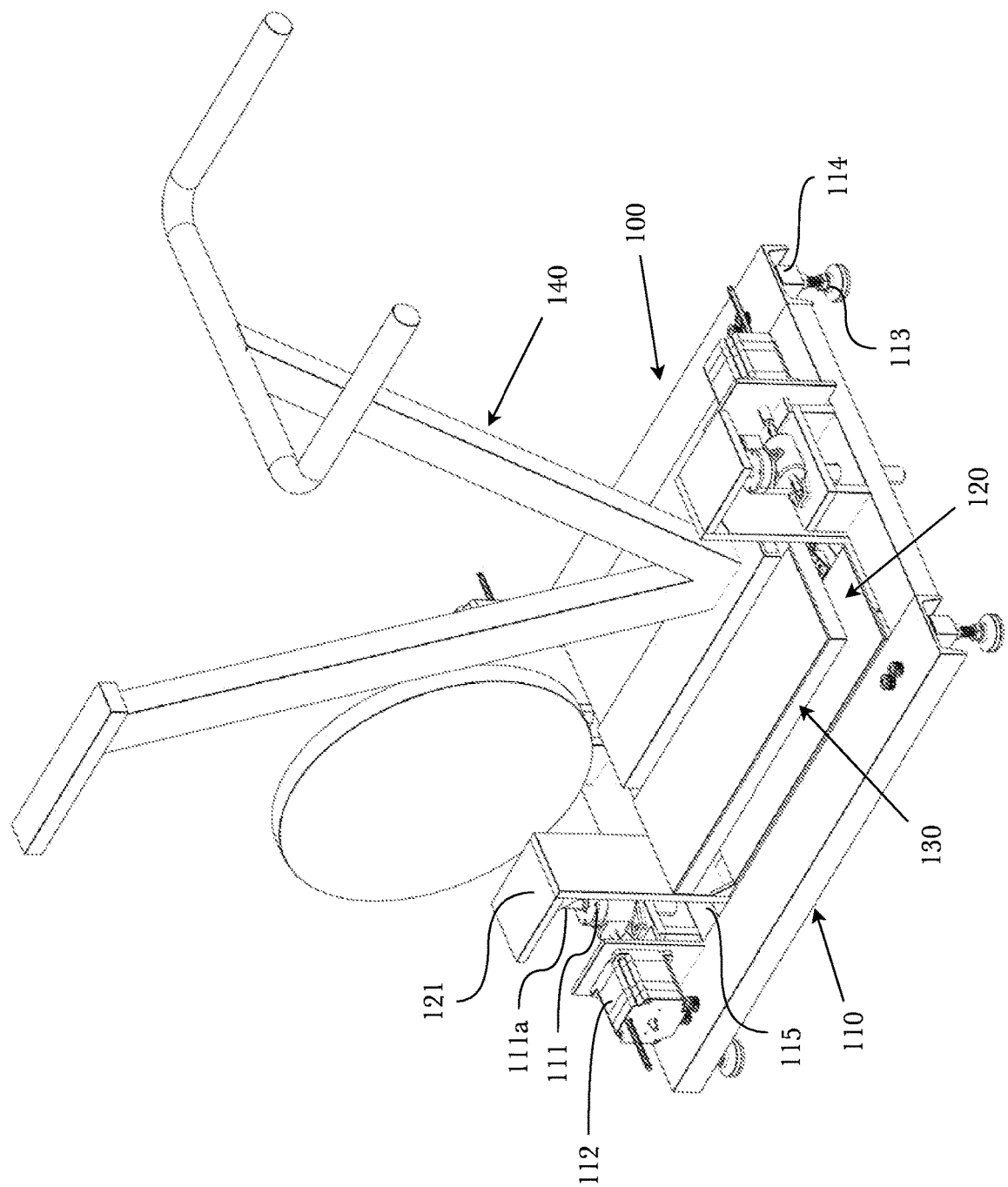
FIG. 1 shows an isometric view of a first exemplary embodiment of an exercise machine platform that allows for emulation of the natural movements of real-world modes of transportation in stationary exercise machines.

The inventor has conceived, and reduced to practice, an exercise machine platform that allows for emulation of the natural movements of real-world modes of transportation in stationary exercise machines such as bicycles, rowing machines, elliptical machines, and treadmills. The exercise machine platform comprises a base with one or more powered lifting mechanisms, a frame supported by the lifting mechanisms of the base which allows for roll, pitch, and/or vertical displacement movements, and a rocker plate supported by the frame that allows for additional independent movement from the roll, pitch, and/or vertical displacement movements of the frame. A dampening system controls the additional independent movement between the frame and rocker plate.

Stationary cardiovascular exercise machines such as bicycles, rowing machines, elliptical machines, and treadmills all have a common drawback, which is that they do not accurately emulate the feel of exercising in the real world. With the exception of changing pitch (incline/decline) in treadmills, these machines do not have the ability to emulate changes in the roll and pitch of the surface in the real world, changes in the texture or unevenness of the surface, vertical displacement caused by encountering of obstacles and other issues, or the natural motion of certain modes of transportation (e.g., the side-to-side sway of a bicycle when pedaled while standing).

Stationary bicycles, for example, are built on fixed, rigid frames which do not allow for roll, or pitch, or vertical displacement movements of the bicycle as would be felt when cycling on a bicycle in the real world. The only elements of realism associated with stationary bicycles are thus changes to difficulty in pedaling and, sometimes, the ability to turn the handlebars in order to steer (as in a virtual reality cycling simulation). However, the natural movements of a real bicycle while cycling are lost. Such movements include, for example, subtle but natural swaying from side to side, changes in the pitch of the bicycle relative to the force of gravity when cycling on a non-level surface (i.e., cycling up a hill or down a hill), tilting of the bicycle during turns, vertical displacement when running over obstacles such as speed bumps or potholes, a natural slight tilt of the bicycle when adjusting the wheel to maintain balance, and an often-pronounced sway of the bicycle when pedaling while standing. The natural movements of a real bicycle, both small and large, significantly affect the feel of cycling in the real world. These natural movements are lost in stationary bicycles, diminishing the enjoyment, engagement, and sense of realism versus cycling on a real bicycle. This reduction in natural sensation of movement contributes to boredom while riding stationary bicycles, reducing both the desire to engage in indoor cycling and the time spent exercising while engaging in indoor cycling. An exercise machine platform that allows for emulation of the natural movements of a real bicycle by a stationary bicycle solves these problems.

The same is true of rowing machines which have fixed frames and no mechanism for emulating roll, pitch, or heave. Controlling the bladder pressure with inflation or deflation, this exercise platform will simulate varying degrees of roll, pitch, and heave (vertical displacement) movements to mimic a range of water vessels, such as a large, stable wooden rowboats or a sleek, fiberglass racing shells. The shifting of the user's body weight while rowing causes all of these movements to a greater or lesser degree, and they can also be caused by waves in the water. Rowing in a racing shell, in particular, requires substantial finesse and balance so as to prevent excessive roll movements and unnecessary rower-induced heave.

An exercise machine platform that allows for emulation of the natural movements of real-world modes of transportation can be used to emulate natural movements for most, if not all, modes of human-powered transportation that can be simulated using a stationary cardiovascular exercise machine. The following are further non-limiting examples of the possible modes of transportation to which the platform can be applied. The platform can be used with a treadmill to emulate a non-level lateral angle in a running surface, such as the camber (convexity from the center of the road to the edges) in paved roads which allows rainwater to run off of the road surface. Such a camber is more pronounced towards the edge of the road, and the roll angle of a treadmill can be adjusted to emulate the degree of camber based on the runner's location relative to the center of the road. Another example of emulation of a non-level running surface would be use of the platform with a stair-stepper or elliptical machine to emulate stairs that are not level. Many concrete stairs are formed slightly off level in the direction of stair descent to facilitate rainwater runoff down the stairway, and some are not level laterally. The platform could also be used with stationary cardiovascular exercise machines that simulate other self-powered modes of transportation such as skates, skateboards, scooters, kayaks, canoes, elliptical bikes, and cross-country skiing.

In addition to emulating natural real-world movements, the exercise machine platform can be synchronized with computer games and simulations. Load cells integrated into the platform can be used to detect both the user's weight, and the position of the user's center of mass (COM) in space (e.g., if the user leans right, the rightmost load cells will see a larger load than the left most and the user's center of mass can be calculated relative to the exercise machine platform and/or the exercise machine the platform. This calculation can be used as input to computer games and simulations. For example, a sideways shift of the user's body weight could be indicate a sideways motion to avoid an incoming projectile, a rearward shift of the user's body weight could indicate riding on the rear wheel (i.e., a wheelie) or unweighting of the front wheel as is common in mountain biking, or a sudden unweighting of all load cells could indicate a jump of the bicycle (i.e., a bunny hop). This sensing of user motions is especially helpful for non-virtual-reality (non-VR) gameplay where a virtual reality (VR) headset is not available to track the user's position. Being able to detect the user's COM is also helpful for determining whether the user is riding the bike in or out of the saddle (sitting or standing). For example, a large forward shift in the user's COM can be indicative that the user has moved from riding in the saddle, to riding out of the saddle, and vice-versa.

The inputs from the load cells can then be processed by the computer game or simulation to change the in-game or in-simulation environment, display the changes on screen, and the exercise machine platform can be adjusted to match the on-screen display. Thus, the exercise machine platform can be used to physically mimic what the user sees on screen (or in a VR headset) in terms of roll, pitch, and vertical displacement to provide a more engaging experience. For example, if a stationary bicycle rider comes across a section of a computer game or simulated workout where he or she needs to bike uphill, the lifting mechanisms of the exercise machine platform will be directed to orient the pitch of the stationary bicycle upward to simulate the in-game or in-simulation riding pitch angle. This may be accomplished, for example, by lowering lifting mechanisms at the rear of the exercise machine platform and/or raising the lifting mechanisms at the front of the exercise machine platform, such that the moveable frame of the exercise machine platform adopts an upward pitch. Roll movements can be accomplished by raising the lifting mechanisms on one side of the exercise machine platform and/or lowering those on the opposite side. Vertical displacement can be accomplished by raising or lowering some or all of the lifting mechanisms such that a vertical motion is achieved. Combinations of roll, pitch, and vertical displacement movements can be achieved through appropriate adjustment of the lifting mechanisms. For example, a bicycle turn to the left while rolling over a wide speed bump could be emulated by first lowering the lifting mechanisms on the left side (roll to the left), then raising the front lifting mechanisms (upward pitch as the front wheel rolls up onto the speed bump), then raising the rear lifting mechanisms (flattening pitch as the rear wheel rolls up onto the speed bump), then lowering the front lifting mechanisms (downward pitch as the front wheel rolls off the speed bump), then lowering the rear lifting mechanisms (flattening pitch as the rear wheel rolls off the speed bump), then raising the lifting mechanisms on the left side as the bicycle comes out of the turn.

A dampening system may be used to adjust the speed of certain movements or the resistance to certain movements of an exercise machine mounted to the exercise machine platform. For example, in one embodiment, gas-filled or fluid-filled bladders may be placed on either side of a rocker plate, and the inflation of the bladders may be adjusted to increase or decrease the resistance to movement of the rocker plate. In some cases, the bladders may be inflated to a high pressure to stabilize the rocker plate (e.g., to increase stability of the exercise machine while a user is mounting the exercise machine). In other cases, the bladders may be deflated to a low pressure to reduce stability of the rocker plate (e.g., to simulate the lateral instability of a row boat). Many combinations of volume, pressure, type of gas or fluid, bladder materials, and bladder shape or construction may be used to mimic certain real-world movement sensations of different types of exercise apparatus. At lower inflation pressures, the volume of the bladders may decrease, whereas at higher inflation pressures, the volume of the bladders will remain constant (i.e., fully inflated) while the pressure rises within the bladder.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

"Rowing machine" as used herein means a stationary cardiovascular exercise machine that simulates the activity of rowing a boat. The term "rower" is synonymous with rowing machine.

"Stationary bicycle" as used herein means a stationary cardiovascular exercise machine that simulates the activity of riding a bicycle, tricycle, or other pedal-powered, wheeled mode of transportation. The term stationary bicycle includes real bicycles mounted to resistance devices (typically called "bicycle trainers") that allow for stationary exercise on the bicycle.

"Real-world mode of transportation" as used herein means any human-powered mode of transportation, whether or not involving a vehicle, such as walking, jogging, running, bicycling, rowing, kayaking, scootering, skateboarding, skating, and cross-country skiing.

"Roll" as used herein means rotation about a front-to-back axis (i.e., a lateral or side-to-side tilt).

"Pitch" as used herein means rotation about a side-to-side axis (i.e., a front-to-back or back-to-front tilt).

"Treadmill" as used herein means a stationary cardiovascular exercise machine that simulates pedestrian modes of transportation such as walking, jogging, or running.

"Vertical displacement" as used herein means a movement upward or downward (i.e., a change in position upward or downward, as opposed to a tilt or lean upward or downward).

Detailed Description of Exemplary Embodiments

FIG. 1 shows an isometric view of a first exemplary embodiment of an exercise machine platform 100 that allows for emulation of the natural movements of real-world modes of transportation in stationary exercise machines. The exercise machine platform 100 of this embodiment comprises a base 110 with powered lifters 111, a frame 120 supported by the lifters 111 of the base 110 which allows for roll and pitch movements, and a rocker plate 130 supported by the frame 120 that allows for additional independent movement from the roll and pitch movements of the frame 120. An exercise machine 140, represented here by a mockup of a stationary bicycle, may be either placed on, or attached to, the rocker plate 130 of the exercise machine platform 100, such that the motions of the exercise machine platform 100 can be felt by a user exercising on the exercise machine 140.

The base 110 is a structure that is in contact with the ground or other floor surface, and that provides a stable foundation for the exercise machine platform 100 and any exercise machine 140 resting on, or attached to, the platform 100. In this embodiment, the base 110 stands on four feet 113 (only three visible in this drawing), each of which contains or is attached to a load sensor 114 allowing for determination of the downward force applied to the foot 113 associated with the load sensor 114. The feet 113 are height adjustable to account for variations in the floor surface. The base 110 further has three jack screws 111 (only two visible in this drawing) mounted with the screw thereof 111a in a vertical position, such that each jack screw 111 can raise or lower an object. The three jack screws 111 in this embodiment are placed in a triangular configuration, allowing any combination of roll, pitch, and vertical displacement adjustments allowed by the operational length of the screws 111a. At the top of each jack screw 111 is affixed a swivel pad (not visible in this drawing) allowing for rotation of the screw with minimal friction against an object supported by the jack screw 111. Each jack screw 111 is powered by an electric motor 112, allowing independent adjustment of the height of each jack screw. In this embodiment, the base has an open area 115 in which rests a portion of the frame 120.

The frame 120 is a structure configured to support the rocker plate 130 and exercise machine 140 at a nominal roll angle and pitch angle determined by operation of the jack screws 111. In this embodiment, the frame 120 comprises a platform with roller bearings (not shown in this drawing) configured to support the rocker platform on a rod (not shown in this drawing) along the central axis of the platform. In this embodiment, the platform of the frame 120 rests inside of the open area 115 of the base 110. The frame has three support arms 121 each configured to be attached to, or placed on, the swivel pads at the top of each jack screw 111, holding the platform of the frame 120 up above the ground or floor surface with sufficient clearance as to allow the platform of the frame 120 to be adjusted to any combination of roll, pitch, and vertical displacement adjustments allowed by the operational length of the screws 111a.

The rocker plate 130 is attached to the frame 120 by a rod running along the central front-to-back axis of the frame 120. The rocker plate 130 is attached to the rod using roller bearings that allow the rocker plate 130 to pivot about the rod in a side-to-side manner. This method of attachment allows for an amount of independent roll movement of the rocker plate 130 from the nominal roll angle determined by the frame 120.

In this embodiment, two air-filled bladders (not show in this drawing) are mounted, one on each side, between the frame 120 and the rocker plate 130 to control the amount of independent roll movement of the rocker plate 130. Depending on configuration, the air-filled bladders may also act as dampers that control the rate of change of the independent roll movement of the rocker plate 130. In one such configuration, the air-filled bladders will be connected to one another such that air can pass between them at a rate determined by a valve, the cross-sectional area of the connection, or other such means of restricting air flow.

Figure 2:
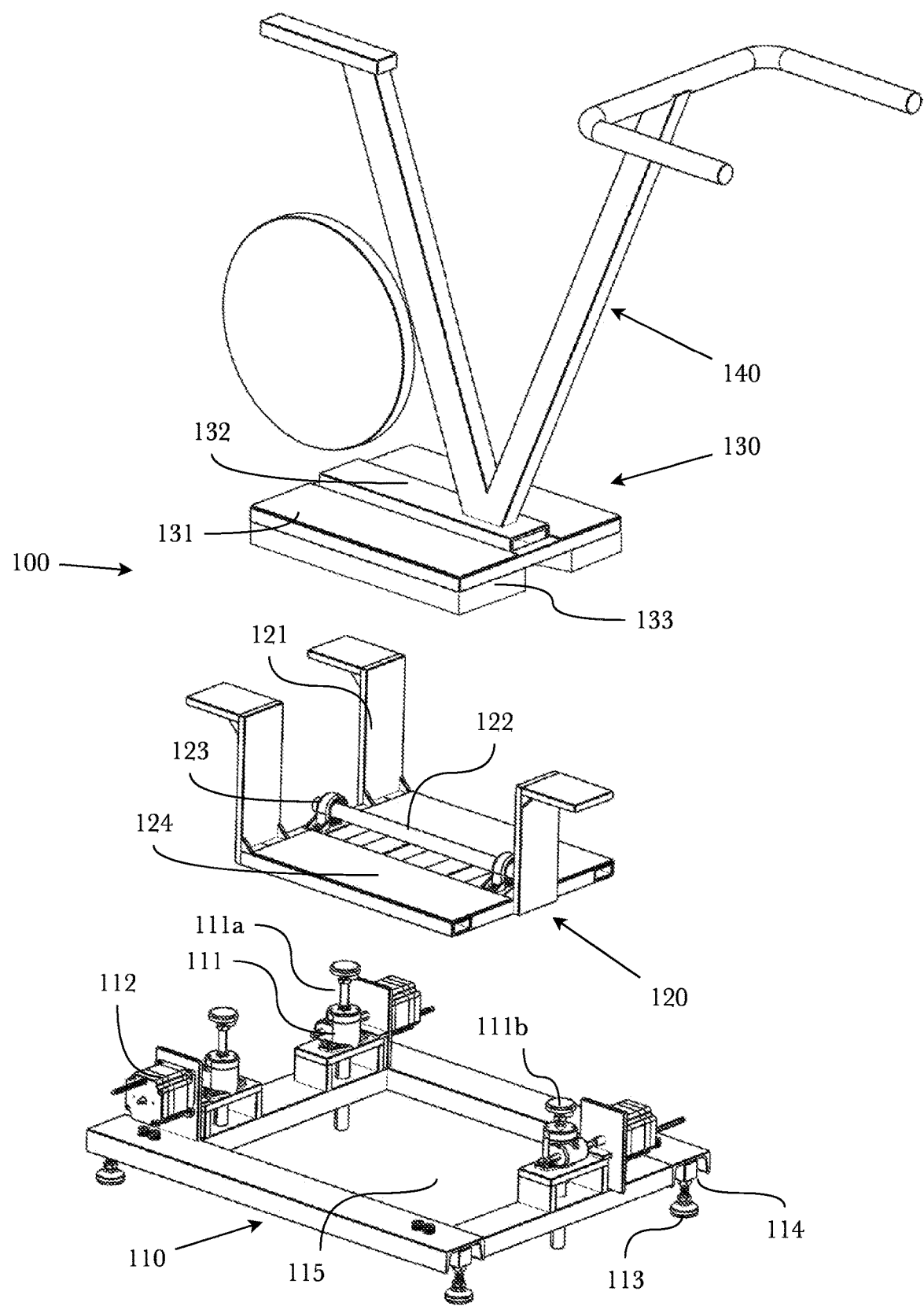
FIG. 2 shows an exploded isometric view of the first exemplary embodiment of the exercise machine platform.

FIG. 2 shows an exploded isometric view of the first exemplary embodiment of the exercise machine platform. The exercise machine platform 100 of this embodiment comprises a base 110 with powered lifters 111, a frame 120 supported by the lifters 111 of the base 110 which allows for roll and pitch movements, and a rocker plate 130 supported by the frame 120 that allows for additional independent movement from the roll and pitch movements of the frame 120. An exercise machine 140, represented here by a mockup of a stationary bicycle, may be either placed on, or attached to, the rocker plate 130 of the exercise machine platform 100, such that the motions of the exercise machine platform 100 can be felt by a user exercising on the exercise machine 140.

The base 110 is a structure that is in contact with the ground or other floor surface, and that provides a stable foundation for the exercise machine platform 100 and any exercise machine 140 resting on, or attached to, the platform 100. In this embodiment, the base 110 stands on four feet 113 (only three visible in this drawing), each of which contains or is attached to a load sensor 114 allowing for determination of the downward force applied to the foot 113 associated with the load sensor 114. The feet 113 are height adjustable to account for variations in the floor surface. The base 110 further has three jack screws 111 mounted with the screw thereof 111a in a vertical position, such that each jack screw 111 can raise or lower an object. The three jack screws 111 in this embodiment are placed in a triangular configuration, allowing any combination of roll, pitch, and vertical displacement adjustments allowed by the operational length of the screws 111a. At the top of each jack screw 111 is affixed a swivel pad 111b allowing for rotation of the screw with minimal friction against an object supported by the jack screw 111. Each jack screw 111 is powered by an electric motor 112, allowing independent adjustment of the height of each jack screw. In this embodiment, the base has an open area 115 in which rests a portion of the frame 120.

The frame 120 is a structure configured to support the rocker plate 130 and exercise machine 140 at a nominal roll angle and pitch angle determined by operation of the jack screws 111. In this embodiment, the frame 120 comprises a platform with roller bearings 123 configured to support the rocker platform on a rod 122 along the central axis of the platform. In this embodiment, the platform of the frame 120 rests inside of the open area 115 of the base 110. The frame has three support arms 121 each configured to be attached to, or placed on, the swivel pads 111*b* at the top of each jack screw 111, holding the platform of the frame 120 up above the ground or floor surface with sufficient clearance as to allow the platform of the frame 120 to be adjusted to any combination of roll, pitch, and vertical displacement adjustments allowed by the operational length of the screws 111*a*. The frame 120 may have flat plates 124 which support the bottoms of the air-filled bladders 133.

The rocker plate 130 is attached to the frame 120 by a rod 122 running along the central front-to-back axis of the frame 120. The rocker plate 130 is attached to the rod 122 using roller bearings on the underside of the rocker plate (not visible in this drawing) that allow the rocker plate 130 to pivot about the rod 122 in a side-to-side manner. This method of attachment allows for an amount of independent roll movement of the rocker plate 130 from the nominal roll angle determined by the frame 120. The rocker plate 130 may have flat plates 131 which are placed on, or attached to, the tops of the air-filled bladders 133. The rocker plate may further have a bearing surface 132 on which the exercise machine 140 may rest, or to which the exercise machine 140 may be attached.

In this embodiment, two air-filled bladders 133 are mounted, one on each side, between the frame 120 and the rocker plate 130 to control the amount of independent roll movement of the rocker plate 130. Depending on configuration, the air-filled bladders 133 may also act as dampers that control the rate of change of the independent roll movement of the rocker plate 130. In one such configuration, the air-filled bladders 133 will be connected to one another such that air can pass between them at a rate determined by a valve, the cross-sectional area of the connection, or other such means of restricting gas or liquid flow.

Figure 3:
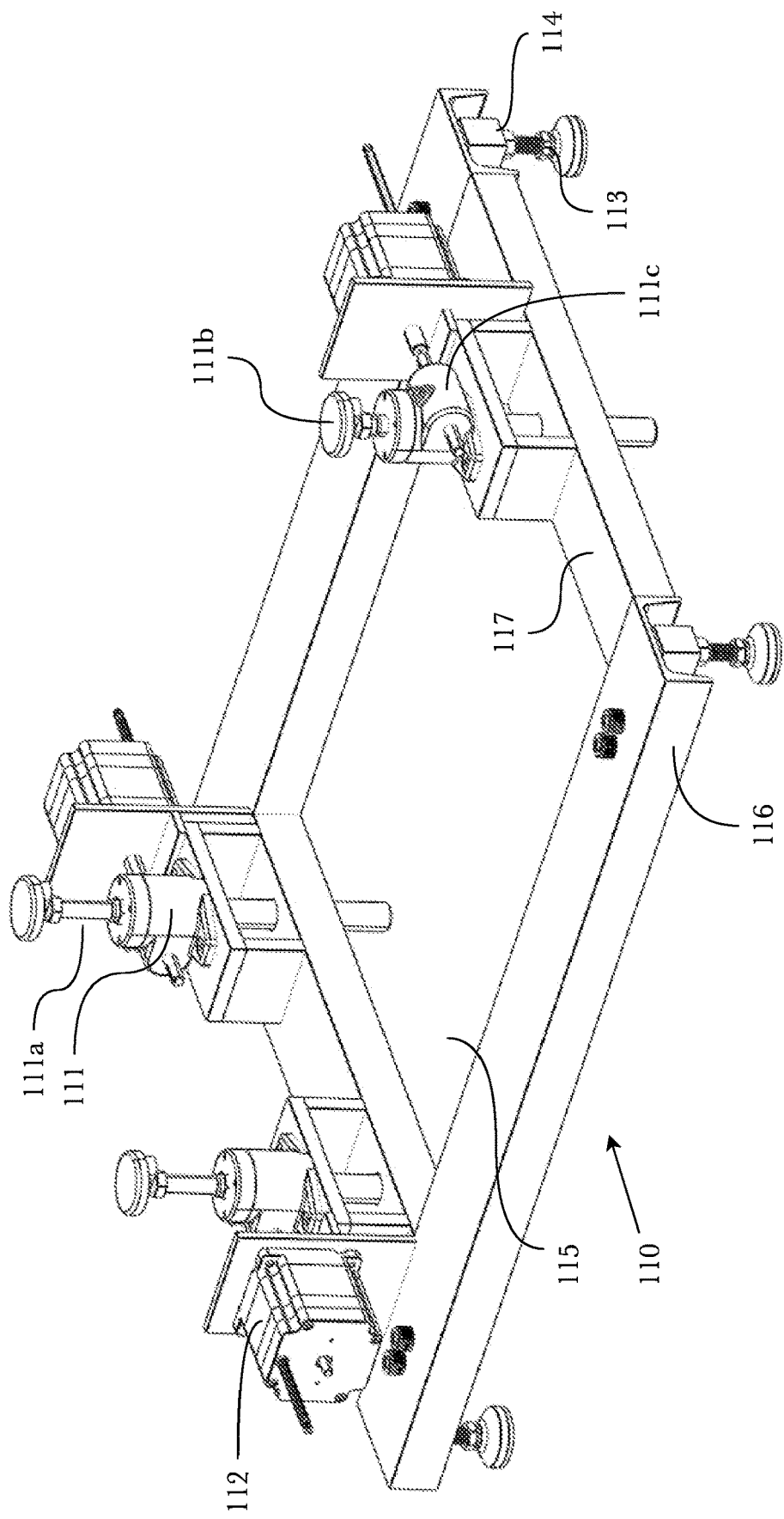
FIG. 3 shows an isometric view of the base aspect of the first exemplary embodiment of the exercise machine platform.

FIG. 3 shows an isometric view of the base aspect of the first exemplary embodiment of the exercise machine platform. In this embodiment, the base is constructed of a combination of steel channel beams 116 and square steel tubing 117, but the base may be constructed from any material or combination of materials suitable for creating a stable platform for support of the other components. The base 110 is a structure that is in contact with the ground or other floor surface, and that provides a stable foundation for the exercise machine platform 100 and any exercise machine 140 resting on, or attached to, the platform 100. In this embodiment, the base 110 stands on four feet 113 (only three visible in this drawing), each of which contains or is attached to a load sensor 114 allowing for determination of the downward force applied to the foot 113 associated with the load sensor 114. The feet 113 are height adjustable to account for variations in the floor surface. The base 110 further has three jack screws 111 mounted with the screw thereof 111*a* in a vertical position, such that each jack screw 111 can raise or lower an object. The three jack screws 111 in this embodiment are placed in a triangular configuration, allowing any combination of roll, pitch, and vertical displacement adjustments allowed by the operational length of the screws 111*a*. At the top of each jack screw 111 is affixed a swivel pad 111*b* allowing for rotation of the screw with minimal friction against an object supported by the jack screw 111. Each jack screw 111 is powered by an electric motor 112, allowing independent adjustment of the height of each jack screw. The power of the electric motors 112 may be transmitted through a drive train, in this case comprising a worm gear 111*c*. In this embodiment, the base has an open area 115 in which rests a portion of the frame 120.

Many other configurations of the base 110 and its components are possible. In other embodiments, the base 110 may be of different shapes, may or may not have an opening 115 in which the frame rests, may have a greater or lesser number of feet 113, may or may not have load sensors 114, and may have different types and numbers of lifting mechanisms 111. As just one example, the jack screws 111 may be replaced by fast-acting pneumatic pistons, which would allow emulation not only of roll, pitch, and vertical displacement, but also for emulation of special effects such as road surface texture and irregularities, running over obstacles such as speed bumps or potholes, extreme terrain changes such as off-road trails, and mountain bike suspension dampening. Other types of lifting mechanisms may include hydraulics, solenoids, cams, and other such devices. More than one type of lifting device may be used on the same base.

Figure 4:
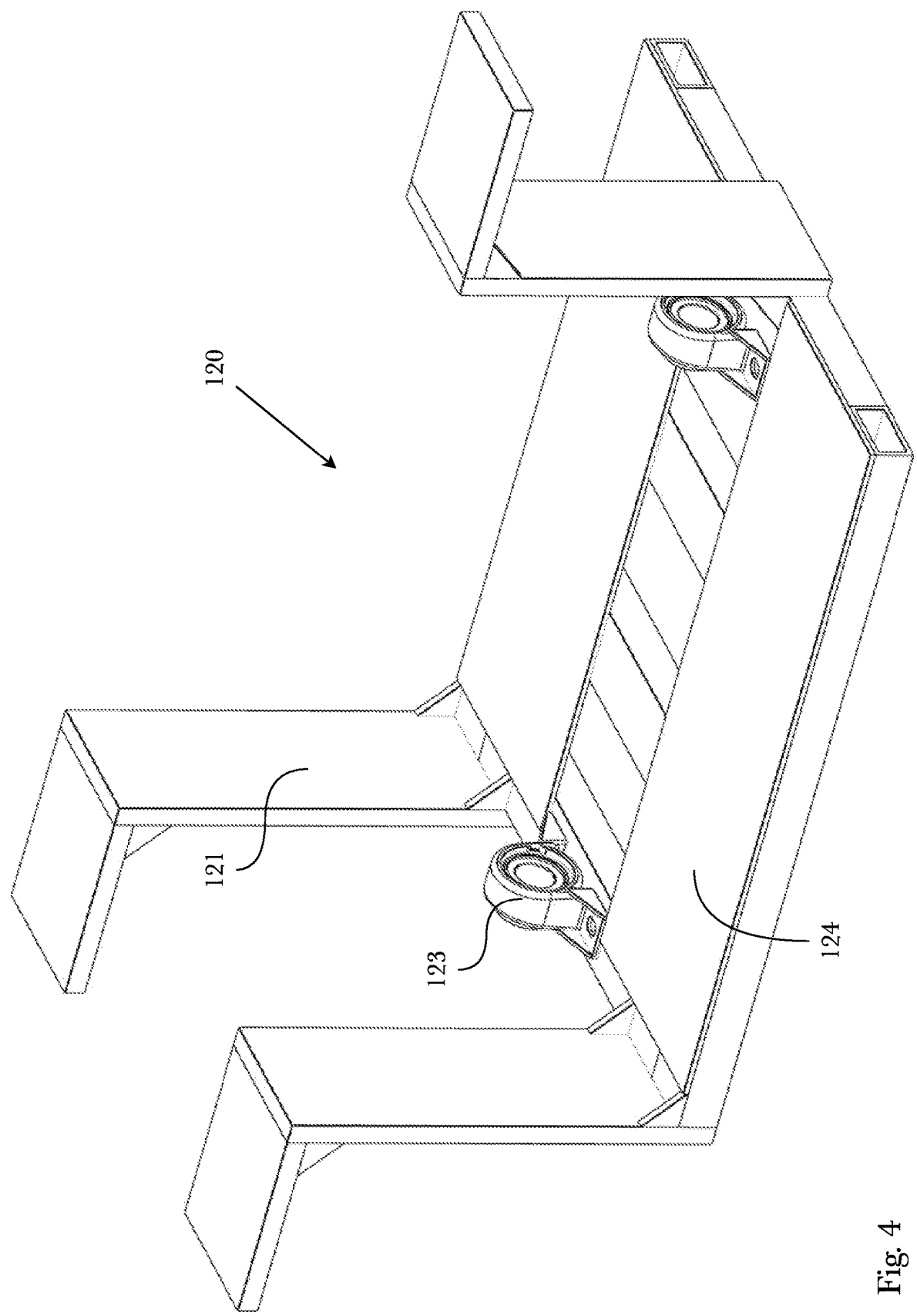
FIG. 4 shows an isometric view of the frame aspect of the first exemplary embodiment of the exercise machine platform.

FIG. 4 shows an isometric view of the frame aspect of the first exemplary embodiment of the exercise machine platform. In this embodiment, the frame is constructed of square steel tubing 125, but the base may be constructed from any material or combination of materials suitable for creating a platform for support of the other components. The frame 120 is a structure configured to support the rocker plate 130 and exercise machine 140 at a nominal roll angle and pitch angle determined by operation of the jack screws 111. In this embodiment, the frame 120 comprises a platform with roller bearings 123 configured to support the rocker platform on a rod (not shown in this drawing) along the central axis of the platform. In this embodiment, the platform of the frame 120 rests inside of the open area 115 of the base 110. The frame has three support arms 121 each configured to be attached to, or placed on, the swivel pads 111*b* at the top of each jack screw 111, holding the platform of the frame 120 up above the ground or floor surface with sufficient clearance as to allow the platform of the frame 120 to be adjusted to any combination of roll, pitch, and vertical displacement adjustments allowed by the operational length of the screws 111*a*. The frame 120 may have flat plates 124 which support the bottoms of the air-filled bladders 133. In some embodiments, the flat plates 124 may be made of any material suitable for providing a bearing surface for the air-bladders, and in some embodiments will be made from a plastic material.

Many other configurations of the frame 120 and its components are possible. In other embodiments, the frame may be of different shapes, may or may not have support arms (i.e., the platform could rest directly on the lifting mechanisms), may have support arms in a position in the same plane as, or lower than, the platform, may have a different number of support arms, or may have certain support arms that span two or more lifting mechanisms. In some embodiments, the platform may be other than planar (e.g., an angled or curved surface), or may not be a platform at all (e.g., comprising supports extending out from a common support structure such as a central beam.). In some embodiments, the frame 120 may support the rocker plate 130 by means other than a rod and bearing system. For example, the frame 120 and rocker plate 130 could be attached by universal joints, cables, ball joints, pistons, shock absorbers, and the like, allowing freedom of movement in any combination of roll, pitch, and vertical displacement. In some embodiments, the frame and rocker plate may be attached only by the bladders or other dampening system or material between them (i.e., the bladders may be attached to both the frame and rocker plate). In some embodiments, the frame and rocker plate are not mechanically attached at all, and the rocker plate is supported by the frame by gravity through the air-filled bladders, other dampening system, or material between them.

Figure 5:
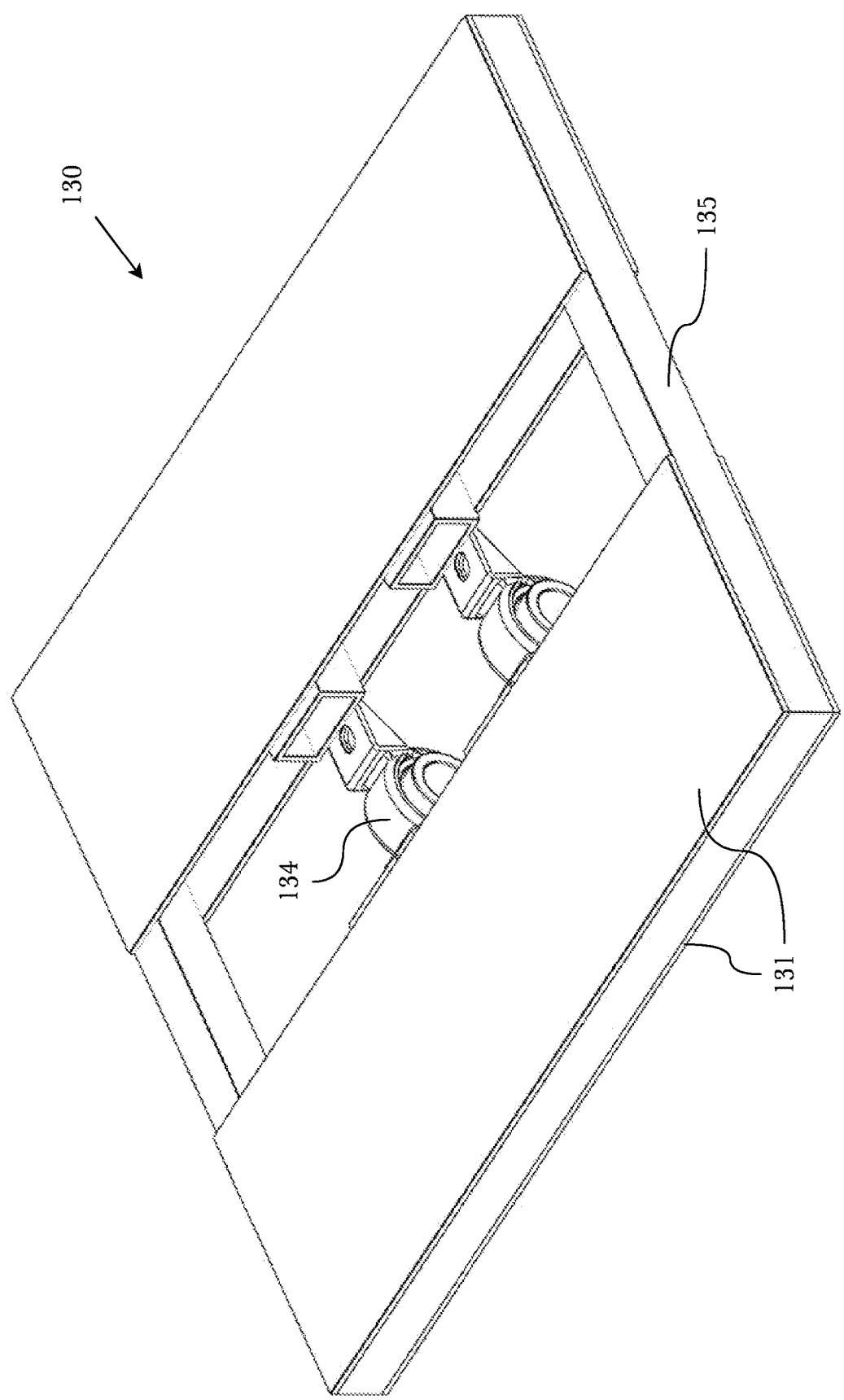
FIG. 5 shows an isometric view of the rocker plate aspect of the first exemplary embodiment of the exercise machine platform.

FIG. 5 shows an isometric view of the rocker plate aspect of the first exemplary embodiment of the exercise machine platform. In this embodiment, the rocker plate is constructed of square steel tubing 135, but the base may be constructed from any material or combination of materials suitable for creating a platform for support of the other components. The rocker plate 130 is attached to the frame 120 by a rod (not shown in this drawing) running along the central front-to-back axis of the frame 120. The rocker plate 130 is attached to the rod 122 using roller bearings 134 on the underside of the rocker plate that allow the rocker plate 130 to pivot about the rod 122 in a side-to-side manner. This method of attachment allows for an amount of independent roll movement of the rocker plate 130 from the nominal roll angle determined by the frame 120. The rocker plate 130 may have flat plates 131 which are placed on, or attached to, the tops of the air-filled bladders 133. The rocker plate may further have a bearing surface (not shown in this drawing) on which the exercise machine 140 may rest, or to which the exercise machine 140 may be attached.

The rocker plate 130 fulfills three roles: acting as a mounting plate for the exercise machine, acting as the top layer that the bladders press up against, and acting as a step for the user to be able to mount the exercise machine. Flat plates 131 (in some embodiments made of polycarbonate sheeting) on top and bottom of the rocker plate 130 provide a smooth and sturdy surface for the bladders to press against when the user is swinging side-to-side and also provide a flat surface for the user to step on while mounting the exercise machine during the "step on" or "mounting" phase as described below.

Many other configurations of the rocker plate and its components are possible. Note that other embodiments will allow for an amount of independent pitch movement, or vertical displacement, or both, of the rocker plate from the nominal roll angle determined by the frame. For example, the rocker plate may be of different shapes or sizes. In some embodiments, the rocker plate 130 may be other than planar (e.g., an angled or curved surface), or may not be a platform at all (e.g., comprising supports extending out from a common support structure such as a central beam.). In some embodiments, the rocker plate 130 may be attached to the frame 120 by means other than a rod and bearing system. For example, the frame 120 and rocker plate 130 could be attached by universal joints, cables, ball joints, pistons, shock absorbers, and the like, allowing freedom of movement in any combination of roll, pitch, and vertical displacement. In some embodiments, the frame 120 and rocker plate 130 may be attached only by the bladders or other dampening system or material between them (i.e., the bladders may be attached to both the frame 120 and rocker plate 130). In some embodiments, the frame 120 and rocker plate 130 are not mechanically attached at all, and the rocker plate is supported by the frame by gravity through bladders, other dampening system, or material between them.

Figure 6:
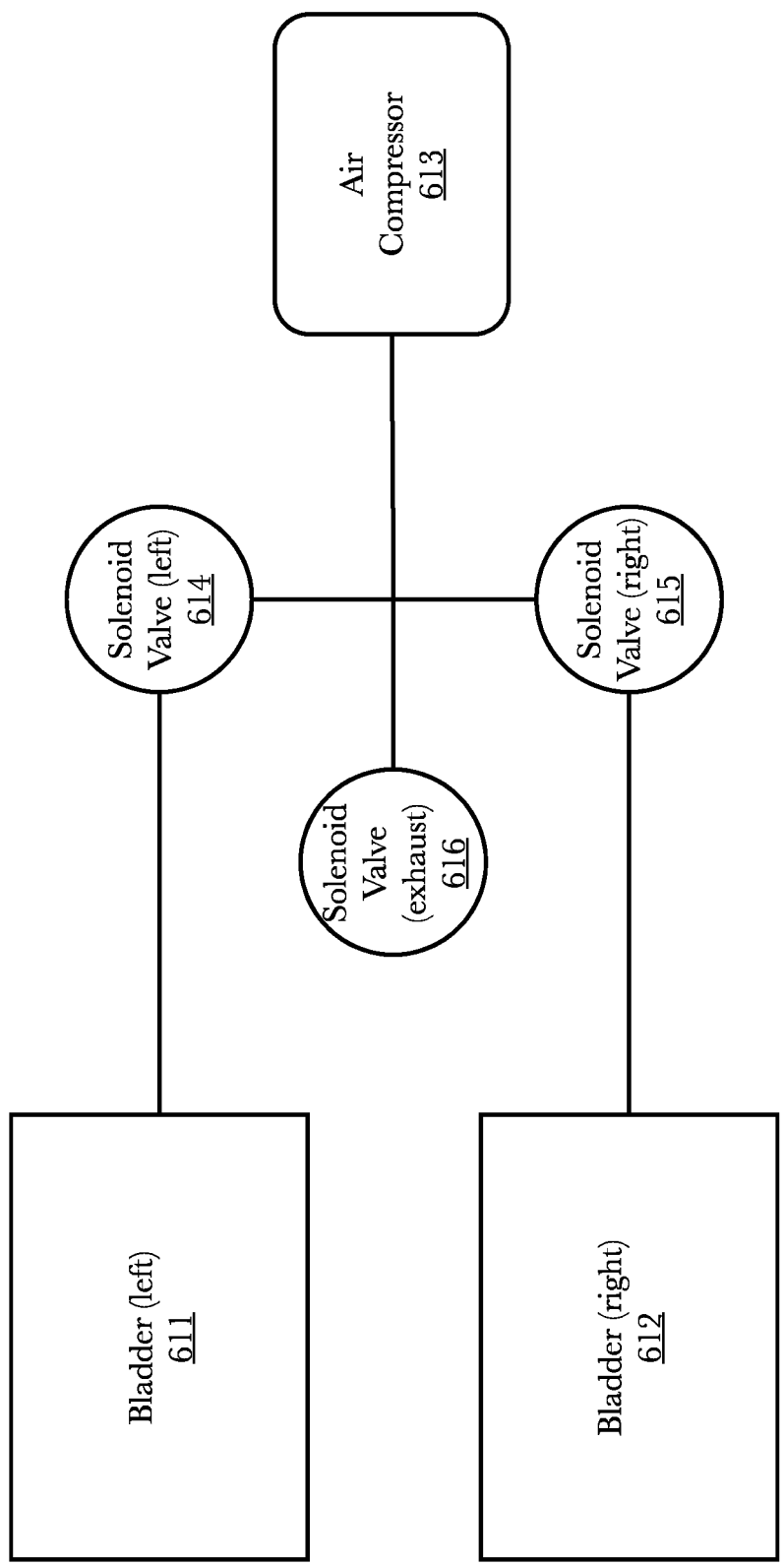
FIG. 6 shows an exemplary dampening system between the frame and the rocker plate.

FIG. 6 shows an exemplary dampening system between the frame and the rocker plate. In this embodiment, the dampening system comprises two air bladders, a left air bladder 611 and a right air bladder 612, and air compressor or compressed air tank 613, and three solenoids, one solenoid 614 controlling inflow and outflow to the left bladder 611, one solenoid 615 controlling inflow and outflow to the right bladder 612, and one solenoid 616 controlling outflow of air from the system. The system operates by receiving one or more inputs (e.g., from a user selection or from weight calculations provided by the load sensors in the base, etc.) and adjusts one or both of the air bladders in response via control of the solenoids 614-616.

The load sensors 114 under the base can be used to make dynamic changes to the air bladders 611, 612. As one example, the dampening system can be configured with a "step on" or "mounting" phase in which the bladders are highly inflated to provide maximum stability to the exercise machine while the user is mounting the exercise machine. Then, the load cells 114 can measure the overall weight of the user, and deflate the bladders 611, 612 to an appropriate pressure for exercise based on the user's weight.

As another example, users can manually select an amount of inflation of the bladders 611, 612 based on training or comfort preferences. Where a more rigorous workout is desired, users can deflate the bladders 611, 612 to reduce the dampening effect and increase physical effort required by the user to keep the exercise machine stable. Conversely, where more comfort is desired, users can inflate the bladders 611, 612 to increase the dampening effect and decrease the physical effort required by the user to keep the exercise machine stable.

As another example, the user's center of gravity can be continuously tracked during exercise using the load sensors 114 in order to make adjustments when the user changes position or shifts weight during use. For example, the load sensors 114 can be used as a control device or game input (for example, detecting that the user has shifted his weight to the side to avoid an in-game obstacle and providing appropriate control signals to the game). The dampening system can be changed by a computer game or simulation as an output, such as softening the dampening system if the user encounters a simulated patch of mud while riding a mountain bike. The dampening system can be changed in response to game selections by the user (such as selecting a road bike with no suspension versus selecting a mountain bike with suspension).

In some embodiments, the bladders 611, 612 may be fluidly connected, allowing gas or fluids to be exchanged between the bladders 611, 612. By allowing gas or fluids to exchange between the bladders 611, 612 in an open system, a unique "rocking" experience is obtained that is different from the feeling obtained is each bladder is a closed system (i.e., where the bladders cannot exchange gas or fluid). In other embodiments, some or all of the bladders 611, 612 may be closed systems with independent gas or fluid pressure. In other embodiments, some or all of the bladders 611, 612 may be open systems with shared gas or fluid pressure. In some embodiments, the rate of exchange of gas or fluid between bladders 611, 612 may be controlled by the size of the fluid connection, by a valve, or by other means of controlling gas or fluid exchange.

In open bladder embodiments, the open bladder system more accurately mimics the feel of a real bike by acting more akin to a damper than a spring. Since the bladders 611, 612 can exchange gas or fluid with each other, the bladders 611, 612 do not hold their current volume upon compression and instead displace gas or fluid to other connected bladders. This limits their ability to provide a restorative force which, in some configurations, more accurately mimics real world forces. For example, in the case of cycling, real word bicycles are not "restored" to the center via external force but rather through a combination of angular momentum, steering, and weight shifting of the rider. While bladders cannot replicate the physical principle of angular momentum, by limiting how much restorative force the bladders provide (e.g., via an open exchange system), the rocking or swinging of the stationary bicycle depends more on the actions of the rider swinging the bike side to side (core workout) than the bladders forcing the bike side to side.

Many other configurations of the dampening system between the frame and rocker plate are possible. In the embodiment shown in this drawing, two air-filled bladders 611, 612 are used, one on the underside of the rocker plate. However, in other embodiments, more or fewer bladders may be used. For example, a single air-filled bladder could be used covering the area between the frame and the rocker plate, which would be useful in reducing manufacturing costs. Alternately, a set of four air-filled bladders could be used, one at least corner of the rocker plate, allowing for adjustment of stiffness of the dampening in two dimensions, front/back and side-to-side. In other embodiments, the bladders may be filled with gasses or gas mixtures other than air, or may be filled with fluids or gels. In some embodiments, the dampening system may comprise deformable, non-inflatable materials between the plates (e.g., foam, rubber, etc.) or a combination or inflatable bladders and deformable, non-inflatable materials. In some embodiments, the dampening system may comprise mechanical or electro-mechanical dampening means other than bladders or non-inflatable materials between the plates such as pistons, shock absorbers, solenoids, cables, elastics, etc. As just one such example, the dampening system may comprise fluid-filled pistons filled with a fluid, the viscosity of which is controllable by passing an electric current through it, such that the resistance of the fluid-filled pistons is electronically controllable in near-real time.

Figure 7:
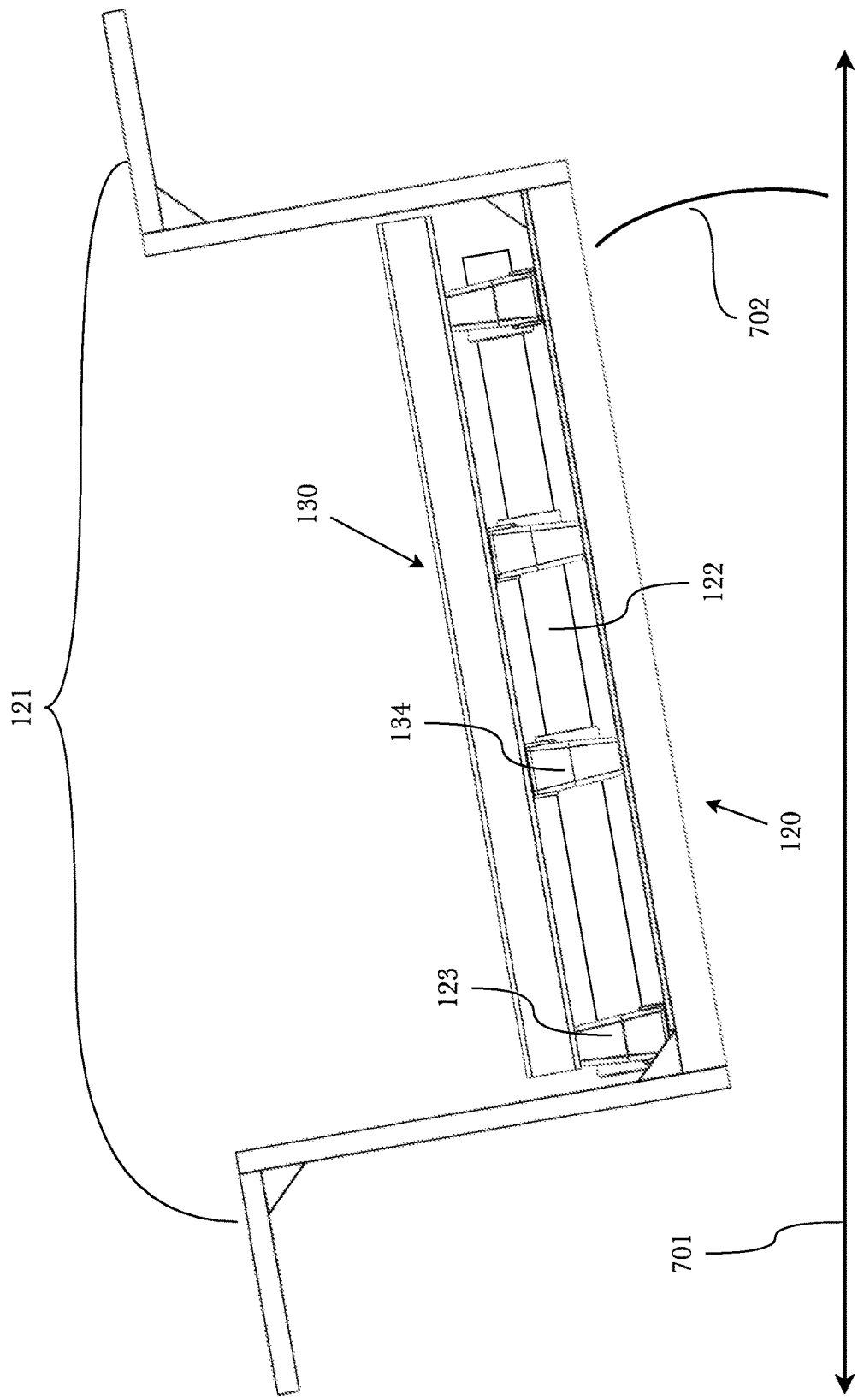
FIG. 7 shows the operation of the pitch control aspect of the first exemplary embodiment of the exercise machine platform.

FIG. 7 shows the operation of the pitch control aspect of the first exemplary embodiment of the exercise machine platform. In this drawing, the frame 120 and rocker plate 130 are shown in a side view attached by a rod 122 along the centerline of the front/back axis of the frame 120 and rocker plate 130 combination, with the rod 122 running through a first set of rotary bearings 123 at either end of the rod 122 attached to the frame 120 and through a second set of rotary bearings 134 closer to the middle of the rod 122 attached to the rocker plate 130. As the lifting mechanisms underneath the support arms 121 of the frame 120 are adjusted, the pitch angle of the frame 120 relative to the plane of the ground (or the plane of the base, depending on configuration) 701 changes. The pitch of the rocker plate 130, being attached to the frame 120 via the rod 122 and bearings 123, 134 is fixed relative to the frame 120 in the pitch direction. In this example, either the lifting mechanisms at the front of the frame have been raised, or the lifting mechanisms at the back of the frame have been lowered, or both, resulting in a positive back to front pitch angle of approximately 10 degrees 702.

Figure 8:
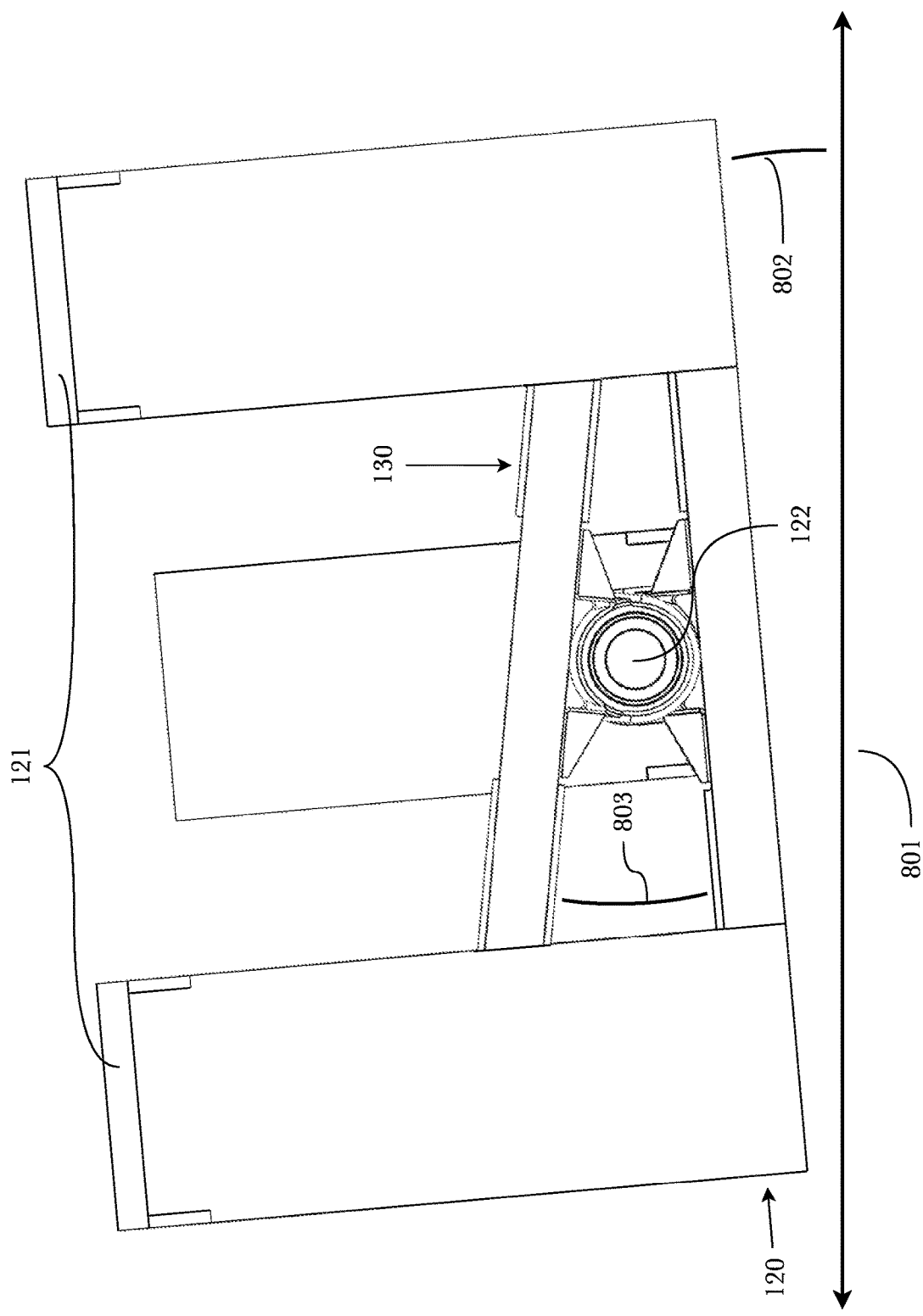
FIG. 8 shows the operation of the roll control and additional independent movement aspects of the first exemplary embodiment of the exercise machine platform.

FIG. 8 shows the operation of the roll control and additional independent movement aspects of the first exemplary embodiment of the exercise machine platform. In this drawing, the frame 120 and rocker plate 130 are shown in a rear view attached by a rod 122 along the centerline of the front/back axis of the frame 120 and rocker plate 130 combination, As the lifting mechanisms underneath the support arms 121 of the frame 120 are adjusted, the roll angle 802 of the frame 120 relative to the plane of the ground (or the plane of the base, depending on configuration) 801 changes. In this case, while the range of the roll of the rocker plate 130 is controlled by the roll of the frame 120, there some degree of independent movement of the rocker plate 130 relative to the roll angle of the frame 120. In this example, either the lifting mechanisms on the right of the frame have been raised, or the lifting mechanisms on the left of the frame have been lowered, or both, resulting in a leftward roll angle 802 of the frame 120 relative to the ground surface 801 of approximately 5 degrees 702. However, the rocker angle is capable of some independent roll 803 relative to the frame 120. In this example, the rocker plate has freedom of roll movement of approximately 10 degrees left or right from the 5 degree leftward roll angle of the frame (i.e., from 15 degrees leftward to 5 degrees rightward relative to the ground 801), and is shown at approximately 10 degrees rightward 803 from the frame 120, which is shown at approximately 5 degrees leftward 802 from the ground 801. Depending on the configuration and dampening, the amount of independent roll freedom of the rocker plate can be greater or less than described here.

Figure 9:
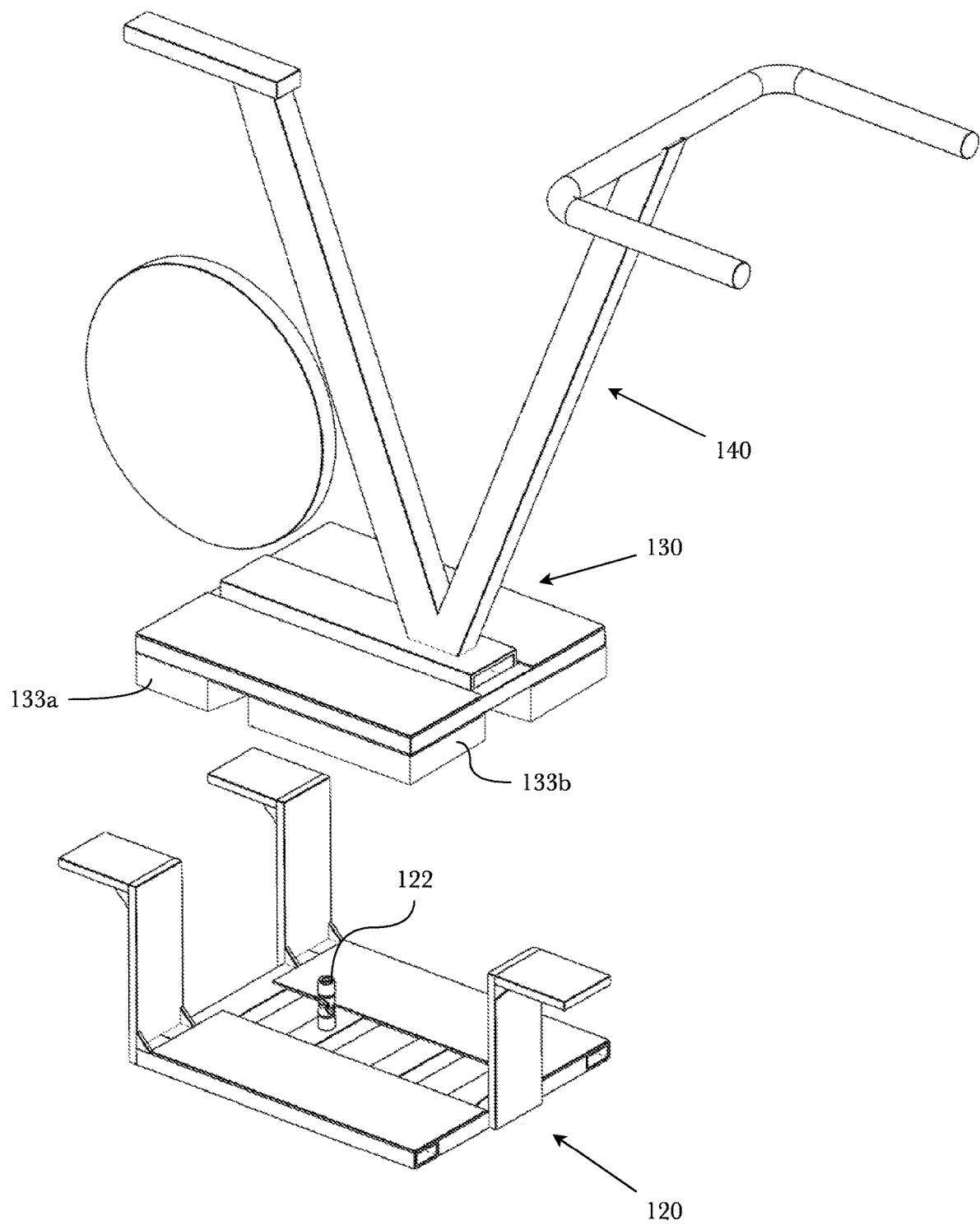
FIG. 9 shows an isometric view of another exemplary embodiment of an exercise machine platform which allows for additional independent pitch movement in addition to additional independent roll movement.

FIG. 9 shows an isometric view of another exemplary embodiment of an exercise machine platform which allows for additional independent pitch movement in addition to additional independent roll movement. In this embodiment, instead of a rod and roller bearing connection, the frame and rocker plate are attached by a universal joint 122, which allows for movement in both the pitch and roll directions. Further, instead of two bladders in the dampening system, four bladders are used, two in back 133*a* and two in front 133*b*. This allows for adjustment of the dampening system in both the pitch and roll directions. In a similar embodiment, the universal joint 122 could be eliminated, using only the dampening system as the connection between the frame 120 and rocker plate 130.

Figure 10:
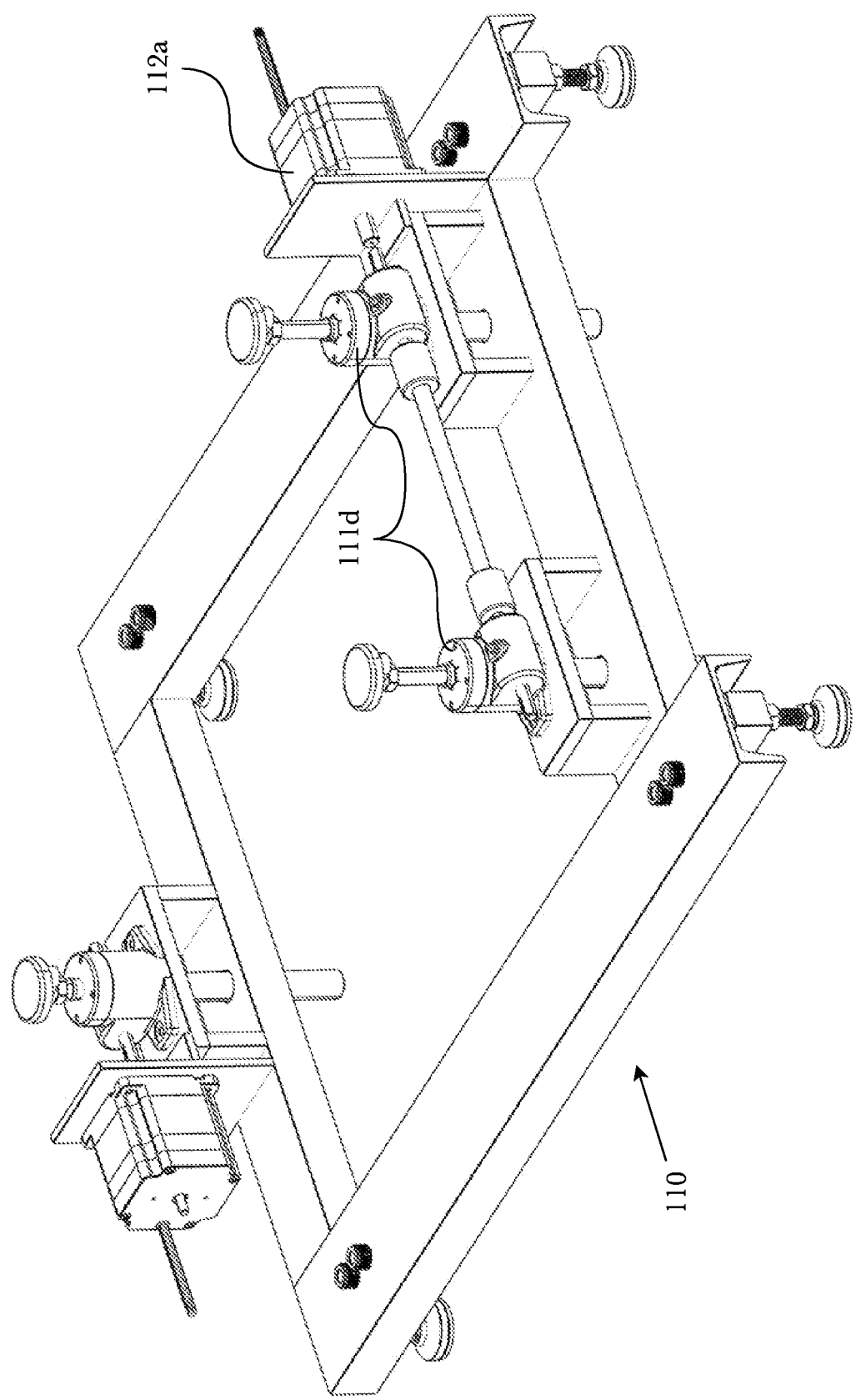
FIG. 10 shows an isometric view of another exemplary embodiment of the base aspect of an exercise machine platform wherein a single motor controls multiple lifting mechanisms.

FIG. 10 shows a rear isometric view of another exemplary embodiment of the base aspect of an exercise machine platform wherein a single motor controls multiple lifting mechanisms. In this embodiment, a single motor 112*a* controls both of the jack screws 111*d* at the back of the base, with the jack screws being threaded opposite one another (i.e., one jack screw has a right-handed thread and the other has a left-handed thread). This arrangement both reduces cost of construction and ensures that both jack screws operated at the same rate, giving more precise and reliable control over roll movements. As with other embodiments described herein, many different configurations of this exemplary embodiment are possible.

Hardware Architecture

Figure 11:
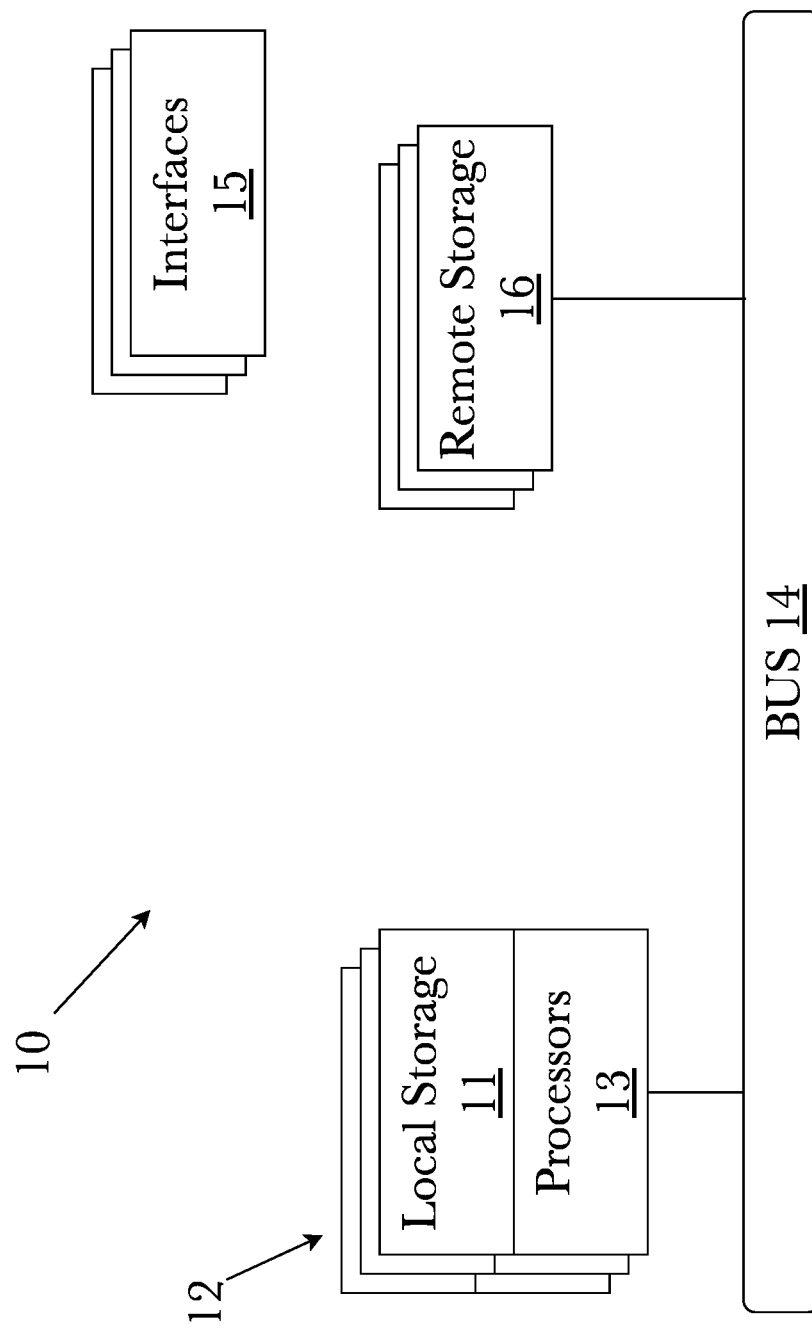
FIG. 11 is a block diagram illustrating an exemplary hardware architecture of a computing device used in an embodiment of the invention.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto optical media such as optical disks, and hardware devices that are specially configured to store and perform program instructions, such as read only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
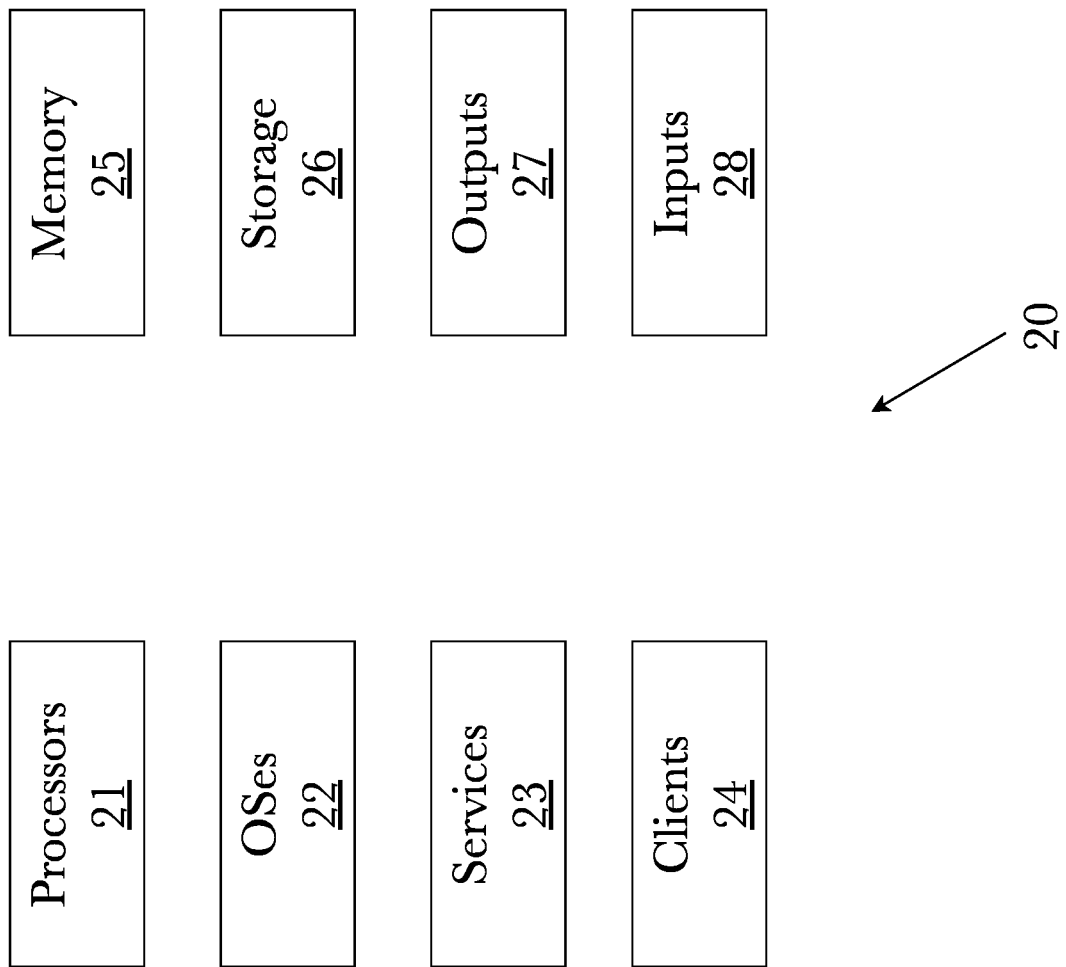
FIG. 12 is a block diagram illustrating an exemplary logical architecture for a client device, according to an embodiment of the invention.

In some embodiments, systems according to the present invention may be implemented on a standalone computing system. Referring now to FIG. 12, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, household gaming devices such as Microsoft XBOX™, Sony PLAYSTATION™, or virtual reality hardware devices such as Oculus RIFT™, HTC VIVE™, Samsung GEAR VR™, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
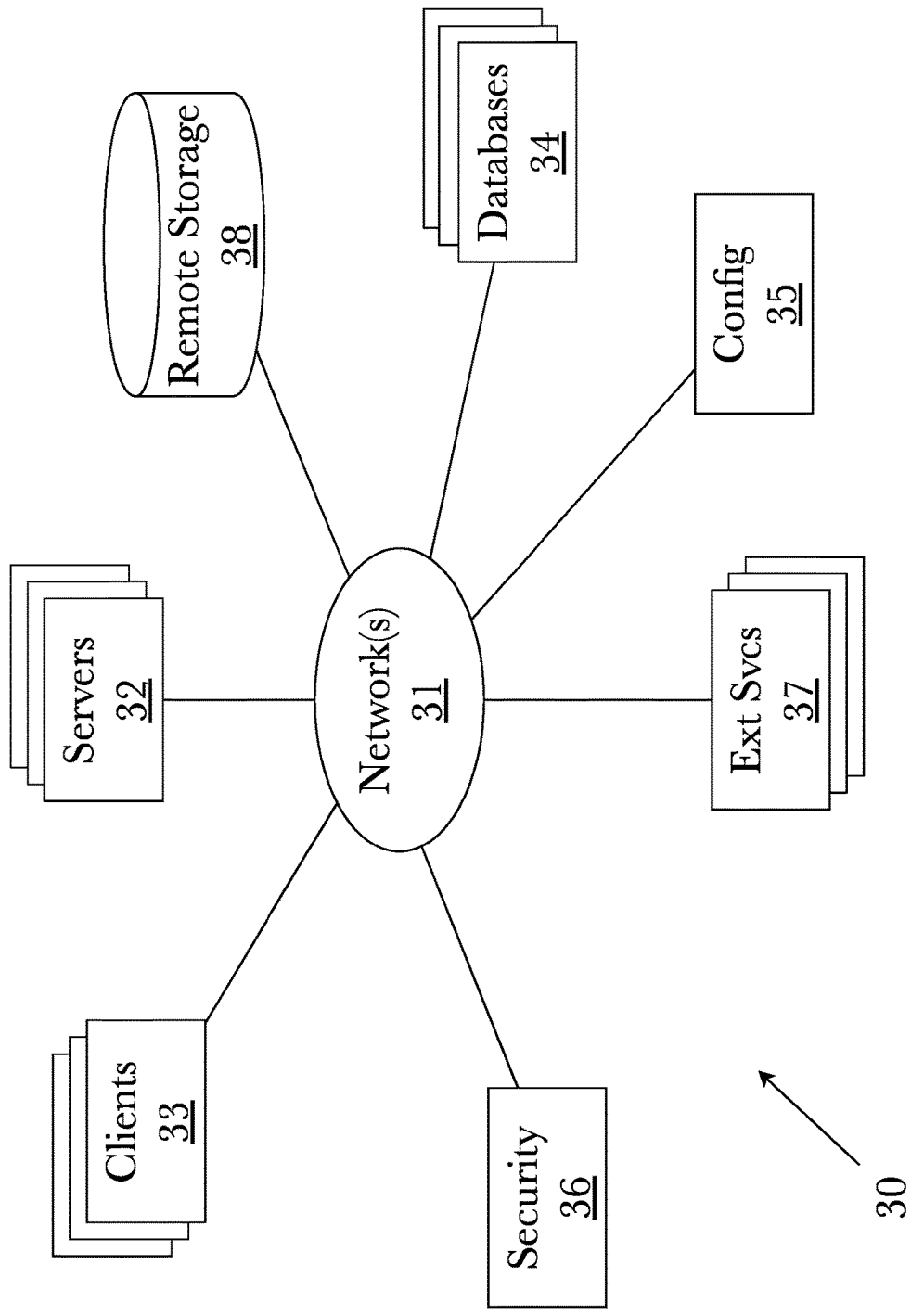
FIG. 13 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 13, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 14:
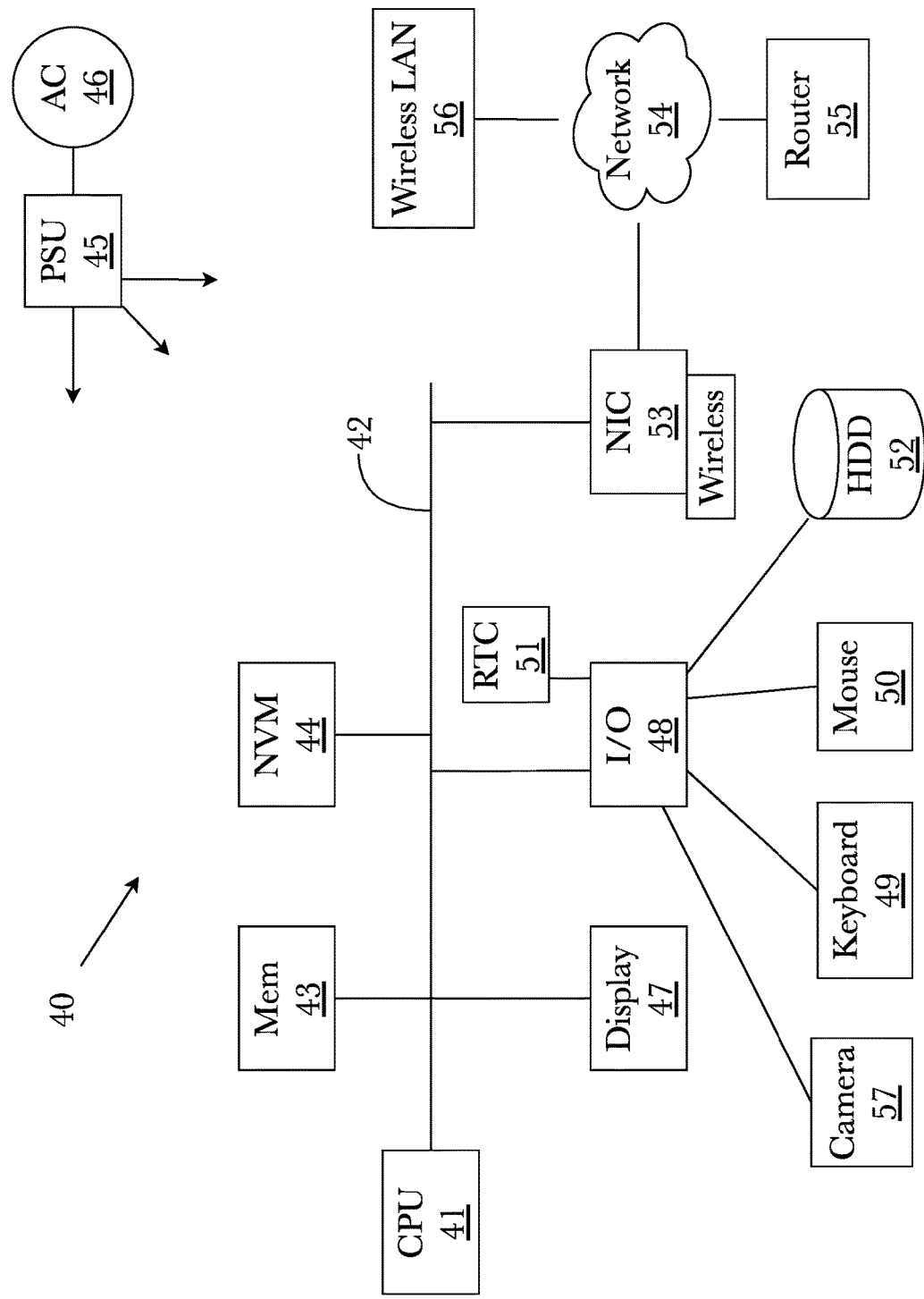
FIG. 14 is another block diagram illustrating an exemplary hardware architecture of a computing device used in various embodiments of the invention.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. An exercise machine platform, comprising:
    a base formed of rigid materials;
    one or more powered lifting mechanisms attached to the base;
    a frame formed of rigid materials, wherein:
        the frame is supported by the one or more powered lifting mechanisms; and
        the support between each powered lifting mechanism and the frame allows sufficient freedom of movement between that powered lifting mechanism and the frame such that operation of one or more of the one or more powered lifting mechanisms changes an angle of the frame relative to the base;
    a rocker plate formed of rigid materials, wherein:
        the rocker plate is supported by the frame; and
        the support between the frame and the rocker plate allows freedom of movement between the frame and the rocker plate in at least one direction; and
    a dampening system between the frame and rocker system;
    wherein the one or more lifting mechanisms are jack screws.

2. The exercise machine platform of claim 1, wherein the support between the frame and the rocker plate is a rod and bearing system allowing for freedom of movement between the frame and rocker plate in a lateral direction relative to the orientation of an exercise machine resting on or attached to the exercise machine platform.

3. The exercise machine platform of claim 1, wherein the support between the frame and the rocker plate comprises a universal joint allowing for freedom of movement between the frame and rocker plate both in a lateral direction and in a longitudinal direction relative to the orientation of an exercise machine resting on or attached to the exercise machine platform.

4. The exercise machine platform of claim 1, wherein the support between the frame and the rocker plate comprises the dampening system.

5. The exercise machine platform of claim 1, wherein the dampening system comprises a gas-filled or fluid-filled bladder.

6. The exercise machine platform of claim 5, wherein the bladder is gas-filled, and further comprising a gas compressor, compressed gas tank, or both, a valve for the gas-filled bladder, and an exhaust valve, wherein the gas-filled bladder can be inflated or deflated.

7. The exercise machine platform of claim 6, wherein the bladder is fluid-filled, and further comprising a fluid pump, a fluid reservoir, a valve for inflation and deflation of the fluid-filled bladder.

8. The exercise machine platform of claim 5, wherein the dampening system comprises two gas-filled or fluid-filled bladders arranged either laterally relative to the orientation of an exercise machine resting on or attached to the exercise machine platform or longitudinally relative to the orientation of an exercise machine resting on or attached to the exercise machine platform.

9. The exercise machine platform of claim 8, wherein the bladders are gas-filled, and further comprising a gas compressor, compressed gas tank, or both, a valve for each gas-filled bladder, and an exhaust valve, wherein the gas-filled bladders can each be independently inflated or deflated.

10. The exercise machine platform of claim 8, wherein the bladders are fluid-filled, and further comprising a fluid pump, a fluid reservoir, a valve for inflation and deflation of each fluid-filled bladder, wherein the fluid-filled bladders can each be independently inflated or deflated.

11. The exercise machine platform of claim 8, wherein the two bladders are coupled such that the gas or fluid contents of the bladders can be exchanged.

12. The exercise machine platform of claim 11, wherein a rate of exchange of gas or fluid contents of the bladders is controlled by a valve in the coupling.

13. The exercise machine platform of claim 11, wherein the bladders are gas-filled, and further comprising a gas compressor, compressed gas tank, or both, a valve for at least one of the gas-filled bladders, and an exhaust valve, wherein the gas-filled bladders can each be inflated or deflated.

14. The exercise machine platform of claim 11, wherein the bladders are fluid-filled, and further comprising a fluid pump, a fluid reservoir, a valve for at least one of the fluid-filled bladders, wherein the fluid-filled bladders can each be inflated or deflated.

15. The exercise machine platform of claim 8, wherein the dampening system further comprises one or more additional gas-filled or fluid-filled bladders arranged on an axis transverse to the orientation of the first two gas-filled or fluid-filled bladders.

16. The exercise machine platform of claim 15, wherein all of the bladders are gas-filled, and further comprising a gas compressor, compressed gas tank, or both, a valve for each of the gas-filled bladders, and an exhaust valve, wherein the gas-filled bladders can each be independently inflated or deflated.

17. The exercise machine platform of claim 15, wherein all of the bladders are fluid-filled, and further comprising a fluid pump, a fluid reservoir, and a valve for each of the fluid-filled bladders, wherein the fluid-filled bladders can each be independently inflated or deflated.

* * * * *